(12) United States Patent
Sweet et al.

(10) Patent No.: US 10,543,706 B2
(45) Date of Patent: Jan. 28, 2020

(54) EIP PROTOCOL CONVERTER SYSTEM FOR LASER FOR DOT PEEN MARKING SYSTEMS

(71) Applicant: Mecco Partners, LLC, Cranberry Twp., PA (US)

(72) Inventors: David Morgan Sweet, Gibsonia, PA (US); Pavel Kyn, Brookline, MA (US); Robert Herman Flanagan, Wayland, MA (US)

(73) Assignee: MeccoPartners, LLC, Cranberry Township, PA (US)

( * ) Notice: Subject to any disclaimer, the term of this patent is extended or adjusted under 35 U.S.C. 154(b) by 139 days.

(21) Appl. No.: 15/919,297

(22) Filed: Mar. 13, 2018

(65) Prior Publication Data

US 2018/0207970 A1    Jul. 26, 2018

Related U.S. Application Data

(63) Continuation-in-part of application No. 15/285,663, filed on Oct. 5, 2016, now abandoned, which is a continuation of application No. 13/963,052, filed on Aug. 9, 2013, now abandoned.

(51) Int. Cl.
| | |
|---|---|
| *B41M 5/24* | (2006.01) |
| *G05B 19/05* | (2006.01) |
| *H04L 29/06* | (2006.01) |
| *H04L 29/08* | (2006.01) |
| *B25H 7/04* | (2006.01) |

(52) U.S. Cl.
CPC .............. *B41M 5/24* (2013.01); *B25H 7/04* (2013.01); *G05B 19/05* (2013.01); *H04L 67/30* (2013.01); *H04L 69/08* (2013.01); *G05B 2219/1214* (2013.01); *G05B 2219/45134* (2013.01)

(58) Field of Classification Search
CPC .......... B41M 5/24; H04L 67/30; H04L 69/08; B25H 7/04; G05B 19/15; G05B 2219/1214; G05B 2219/45134
See application file for complete search history.

(56) References Cited

U.S. PATENT DOCUMENTS

| | | | |
|---|---|---|---|
| 6,055,632 A | 4/2000 | Deegan et al. | |
| 6,167,406 A | 12/2000 | Hoskins et al. | |
| 6,636,521 B1 * | 10/2003 | Giulianelli | G06F 9/541 |
| | | | 370/407 |
| 6,772,413 B2 * | 8/2004 | Kuznetsov | G06F 8/51 |
| | | | 709/231 |
| 7,676,279 B2 | 3/2010 | Wood et al. | |
| 7,761,460 B1 | 7/2010 | Hall | |
| 7,778,713 B2 | 8/2010 | Grgie | |

(Continued)

FOREIGN PATENT DOCUMENTS

| | | |
|---|---|---|
| WO | WO2008050141 A1 | 5/2008 |
| WO | WO201005022 A1 | 5/2010 |

*Primary Examiner* — M. N. Von Buhr
(74) *Attorney, Agent, or Firm* — Kathleen Roznicki; The Lynch Law Group, LLC

(57) ABSTRACT

The EIP Protocol Converter System is a system that facilitates integration of laser or dot peer marking systems into factory automation networks using the standard EtherNet/IP (EIP) protocol. Built-in support for the EIP protocol greatly simplifies the PLC programming task, and lowers the cost of integrating the marking system into factory operations.

10 Claims, 7 Drawing Sheets

(56) References Cited

U.S. PATENT DOCUMENTS

| | | | |
|---|---|---|---|
| 7,792,981 B2* | 9/2010 | Taylor | H04L 29/06 370/466 |
| 8,069,436 B2 | 11/2011 | Synder et al. | |
| 8,266,308 B2* | 9/2012 | Rydberg | H04L 69/08 709/200 |
| 9,953,280 B2* | 4/2018 | Cooper | G05B 15/02 |
| 2002/0161827 A1 | 10/2002 | Brault | |
| 2002/0161907 A1* | 10/2002 | Moon | H04L 69/08 709/230 |
| 2003/0015507 A1 | 1/2003 | Miller et al. | |
| 2003/0217125 A1* | 11/2003 | Brancati | H04L 67/22 709/220 |
| 2005/0267882 A1* | 12/2005 | Aupperlee | G05B 19/042 |
| 2007/0047279 A1* | 3/2007 | Evans | G06F 9/541 365/1 |
| 2008/0023455 A1 | 1/2008 | Idaka et al. | |
| 2010/0153412 A1 | 6/2010 | Mavrov et al. | |
| 2010/0257277 A1* | 10/2010 | Batke | H04L 67/125 709/230 |
| 2013/0178969 A1 | 7/2013 | Zanichelli et al. | |
| 2014/0369179 A1* | 12/2014 | Ueda | H04L 45/00 370/217 |
| 2016/0328442 A1* | 11/2016 | Waas | G06F 16/252 |
| 2017/0070362 A1* | 3/2017 | Tappeiner | G05B 11/01 |

\* cited by examiner

EIP Object Model

```
#define RAPI_MAX_NUM_SHORT_FIELDS  5
#define RAPI_MAX_NUM_LONG_FIELDS   1
```

```
typedef struct                    typedef struct                    typedef struct
{                                 {                                 {
    uint32   str_len;                 uint32   str_len;                 uint32   str_len;
    char     str[32];                 char     str[64];                 char     str[128];
} CIP_STR32;                      } CIP_STR64;                      } CIP_STR128;
```

```
typedef struct
{
    uint8     index;
    uint8     unique;
    uint8     verify;
    uint8     justify;
} CIP_INDEX;

typedef struct                    // Outbound from PLC
{
    int16     x_offset_mm;
    int16     y_offset_mm;
    int16     rotation_deg;
    int16     x_rot_center_mm;
    int16     y_rot_center_mm;
    uint16    x_scale;
    uint16    y_scale;
    uint16    reserved;
    uint16    cmd_seq_num;
    uint16    LEC_computed_job_field_num;
    uint16    job_tmo_sec;
    uint16    tcp_tmo_sec;
    uint16    barcode_pass_grade;
    uint16    max_remarks;
    CIP_INDEX short_field_index[RAPI_MAX_NUM_SHORT_FIELDS];
    CIP_INDEX long_field_index[RAPI_MAX_NUM_LONG_FIELDS];
    CIP_STR32 job_file_name;
    CIP_STR32 camera_job_file_name;
    CIP_STR32 short_field_string[RAPI_MAX_NUM_SHORT_FIELDS];
    CIP_STR128 long_field_string[RAPI_MAX_NUM_LONG_FIELDS];
} CIP_O2T_OUTPUT;

typedef struct                    // Inbound to PLC
{
    uint16    marker_state;
    uint16    reserved;
    uint32    last_mark_cycle_time_ms;
    uint32    status_gpio;
    uint16    marker_error_code;
    uint16    controller_error_code;
    uint32    heart_beat;
    uint32    input_field_checksum;
    CIP_STR32 echo_job_file_name;
    CIP_STR128 results_field;
    CIP_STR64 marker_state_desc;
    CIP_STR128 marker_error_desc;
} CIP_T2O_INPUT;
```

Fig. 1

EIP PROTOCOL CONVERTER SYSTEM FOR LASER FOR DOT PEEN MARKING SYSTEMS

PRIORITY CLAIM

This Continuation-In-Part Application claims priority U.S. application Ser. No. 15/285,663 filed on Oct. 5, 2016, which in turn is a continuation application claiming priority to U.S. application Ser. No. 13/963,052 filed on Aug. 9, 2013, now abandoned.

FIELD OF THE INVENTION

Providing an industry standard communication interface to marking systems.

BACKGROUND

Many industries including automotive, defense, aerospace, medical device, metalworking, fabrication, and assembly have requirements to mark parts or products. Direct part marking, laser marking, laser engraving and dot peen marking systems are used to mark parts for traceability and part verification. Current systems employ Windows based computers to control marking systems using commands that conform to the marker supplier's proprietary application programming interface (API).

Windows based computers are unsuitable for the modem day manufacturing floor, due to their need for software administration, and general lack of robustness. In manufacturing environments, programmable logic controllers (PLCs) are preferred. A PLC is a small, rugged computer, expressly designed for real-time control of industrial machines and devices. PLCs execute a control program, stored in programmable memory, to read sensors and perform machine control, timing, counting, and data handling. Ladder logic is widely used to write control programs for PLCs, where sequential control of a process or manufacturing operation is needed. Ladder logic represents a control program in the form of a ladder diagram, analogous to the circuit diagrams that describe hardware relay logic. Ladder logic has been adopted due to the wide variety of engineers and technicians that can understand and use it with little training. The ladder logic control program is often used in conjunction with an HMI (Human Machine Interface) program operating on a computer workstation.

Ladder logic can be thought of as a rule-based, rather than a procedural, language. A "rung" in the ladder represents a rule. When implemented with relays and other electromechanical devices, the various rules "execute" simultaneously and immediately. When implemented in a PLC, the rules are executed sequentially in a repeating loop (scan). By executing the loop rapidly, many times per second, the effect of simultaneous and immediate execution is achieved to within the time tolerance ("scan time") required to execute all rungs in the "loop".

Employing sensors to monitor external events, PLCs deliver rapid, real-time response to control machine operations. Software tools can provide visibility into the PLC control program's real-time operation as it executes, to find and fix problems. PLCs can have fixed, or modular I/O configurations for flexibility. A microprocessor internal to the PLC executes the ladder logic control program, and manages communication links to external equipment.

Current laser and dot peen marking systems employ supplier-specific proprietary APIs that are designed to be programmed using Windows-computer-based VB.Net and C# programming tools. The difficulty of programming these APIs with PLC ladder logic limits their functionality and hinders their use on the manufacturing floor. This problem is compounded by the proprietary nature of the APIs, as they do not conform to a common industry standard.

What is needed in the laser and dot peen marking industry is a system that conforms to common industry standards and facilitates the use of PLC ladder logic to program marking systems. This improves robustness, by allowing PLC's to replace Windows computers, and saves time and money, by no longer requiring engineers to leant proprietary APIs for each different marking system.

EtherNet/IP Industrial Protocol (EIP) is a flexible communication protocol specifically designed for industrial automation, and is an industry standard for interfacing PLCs, machines, and devices. EIP should not be confused with Ethernet network equipment in general. However, EIP has not been employed in the automated marking industry, because to-date, no marking system API's were available that supported EIP, as confirmed by a market search. EIP encapsulates the Control and Information Protocol (CIP), a widely implemented standard used in DeviceNet and ControlNet systems. CIP allows EIP and DeviceNet product developers, system integrators, and users to apply the same objects and profiles for plug-and-play interoperability among devices from different suppliers and across multiple networks. A common set of objects are used to control devices falling in the same device class, even from different manufacturers. The user benefits from interoperability among devices irrespective of the manufacturer or the device type.

Laser and dot peen marking systems are available from numerous manufacturers and provide a wide variety of marking functions. The difficulty of programming proprietary marking system APIs using PLC ladder logic hinders the use of more complex marking system functions. As a result, automated industrial marking solutions often do not realize the full potential of a laser or dot peen marker. What is needed is a system that provides easy, robust, and cost-effective PLC control of laser and dot peen marking-systems. The EIP Protocol Converter System is such a system

SUMMARY OF THE INVENTION

Disclosed is an EIP Protocol Convert System that facilitates integration of laser and dot peen marking systems into factory automation networks. This is accomplished by providing an industry standard EtherNet/IP interface to third party marking systems from multiple suppliers. The EIP Protocol Converter System simplifies the development of PLC control programs to manage marking systems and eliminates the need for Windows based computer programming.

SHORT DESCRIPTION OF FIGURES

FIG. 1 depicts a non-limiting representative embodiment of the EIP object model.

DETAILED DESCRIPTION

Figure 2:
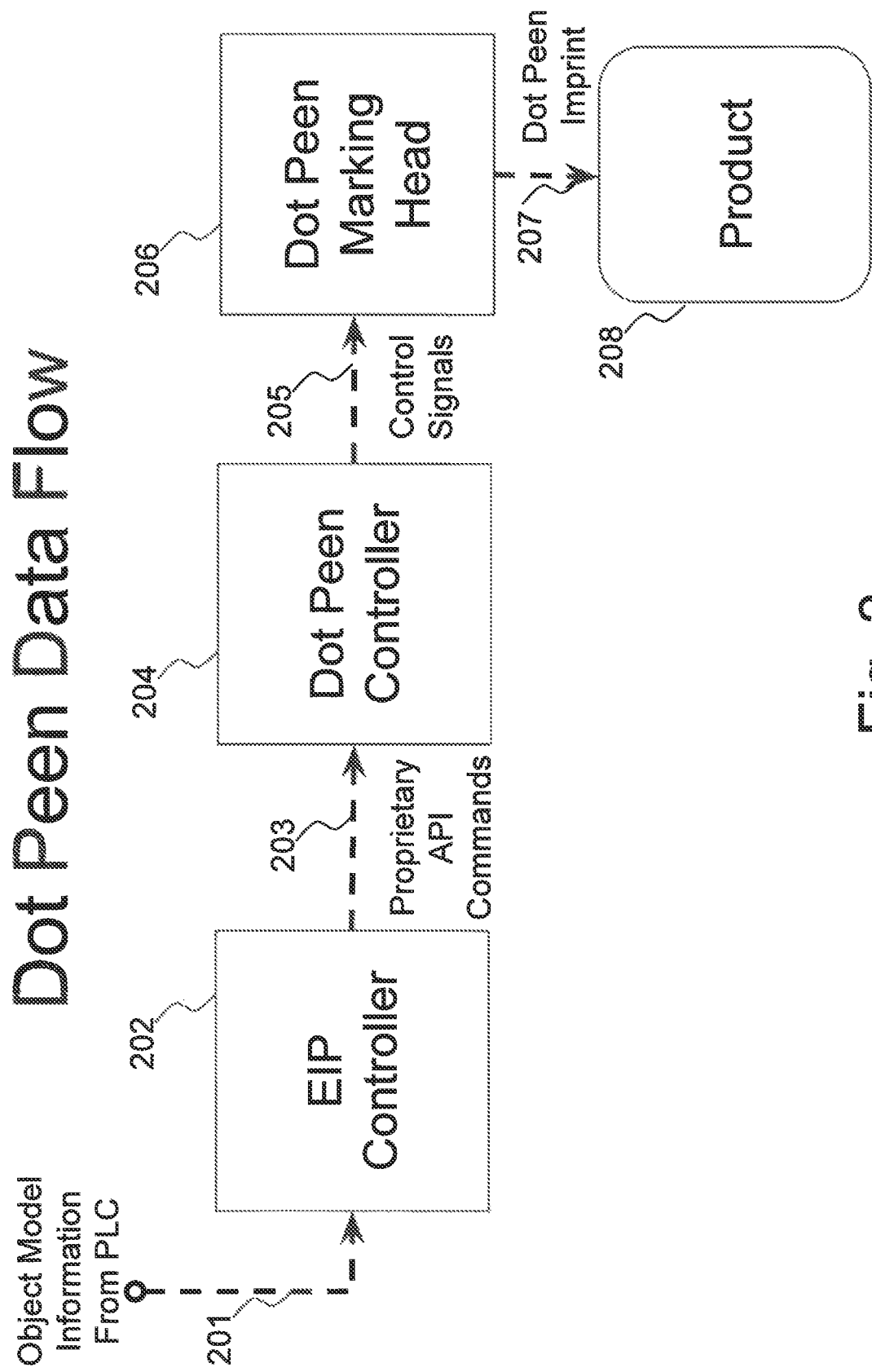
FIG. 2 depicts an embodiment of the EIP Protocol Converter System in use with a dot peen controller.

EtherNet/IP (EIP) is a flexible application layer communication protocol that is specifically targeted to industrial automation. EIP leverages the transport and control protocols used in traditional Ethernet including the Transport Control Protocol (TCP), Internet Protocol (IP), User Datagram Protocol (UDP), and the media access and signaling technologies found in off-the-shelf Ethernet interface equipment. EIP is based on a widely implemented standard used in DeviceNet and ControlNet called the Control and Information Protocol (CIP). CIP provides a common object-oriented language for describing the nodes and services on a CIP network, whether the network is implemented using DeviceNet, ControlNet, EtherNet/IP, or any other compatible technology. This makes existing knowledge and expertise transferable, facilitating the replacement or upgrading of existing systems, and reducing the cost of training development and support personnel. It also means that firmware or software written in a high-level language such as C/C++ can be re-used with minimal redesign. CIP also defines standard device profiles for each class of devices. For example, laser marking and dot peen marking devices have standard profiles, which define objects, configuration options, and I/O data formats. Devices that follow one of the standard profiles will have the same I/O data and configuration options, will respond to the same commands, and will have the same behavior as other devices that follow that same profile. This standardization significantly reduces the need for custom PLC software development, and thus reduces cost.

The EIP Protocol Converter System brings the combined benefits of EIP and PLC technologies to laser and dot peen marking systems from various third party suppliers such as the LEC Laser Controller from Lanmark Controls, and the MC-2000T2 Dot Peen Controller from Couth. The EIP Protocol Converter System can be utilized with any equivalent marking controllers (as defined above) from any third party manufacturers. The EIP Protocol Converter system enables PLCs to employ PIP protocol to control these types of marking systems. Third party supplier's marking systems do not accept EIP protocol directly. In the disclosed EIP Protocol Converter System, the EIP Controller translates the commands, setpoints, and data received from the object model via the EIP into a sequence of proprietary API commands that is recognized by a specific supplier's marking system. This translation, or protocol conversion, is performed by the EIP Controller which interprets information within the EIP protocol, and then maps this information to a functionally equivalent series of API commands that are recognized by the specific supplier's particular marking controller.

The EIP Protocol Converter System works in conjunction with any general purpose marking system equivalent to those stated above when an object model with the necessary information is generated by a PLC. In its most used capacity, the EIP Protocol Converter System simplifies communication from the PLC to two commands: one command to define a marking job (Load Job File), and one command to carry out the marking job (Prepare and Mark Job). In other capacities, the EIP Protocol Converter System can simplify to more than the two commands stated above; other commands defined below can be added if desired. Communication follows the object model structure defined in the EIP protocol. Common marking controllers permit remote control over serial or Ethernet links, but do so only using proprietary API command protocols, which require a complicated PLC programming effort to implement. The EIP Protocol Converter System integrates a standard EIP communication interface between a PLC and a general purpose marking controller, and supervises and controls that general purpose marking controller's operation. The system receives commands, setpoints, and data from a PLC via EIP, and translates them to the proprietary API command protocol used by the general purpose marking device. Built-in support for the EIP protocol greatly simplifies the PLC programming task and lowers the cost of integrating the marking system into factory operations.

The EIP Protocol Converter System is designed to simplify the operation of different marking systems mom different vendors, from the perspective of the PLC programmer. This simplicity is accomplished through careful design of an object model with all necessary information stored in a table. The object model represents a "virtual" marking system that is then mapped to a specific general purpose marking controller. The marking controller can be a laser or dot peen controller as discussed above. A representative non-limiting embodiment of an object model appears in FIG. 1. The object model encapsulates the functions that control all aspects of the marking operation. The functions include commands, setpoints, and marking data expressed in a table of tags that codify values of specific functions. The PLC programmer can develop a PLC program that simply writes desired values into respective tags in the table. Following this, marking a product can be simplified to executing just two EIP commands: load the job file defining the mark job (Load Job File), and execute the mark job (Prepare and Mark Job). Other commands (defined below) can be added if desired. The object model is exposed in the EIP protocol, and manifests as a compound data structure combining a command, marking data, and setpoints. The setpoints define programmable attributes of the marking process, such as position, scale, and rotation. The customer-supplied marking data is comprised of human readable text and/or barcodes to be marked. The command selects one of twenty specific tasks the System is to execute, the key ones being defining the mark job, and executing the marking process. Task: execution is performed by a software-driven finite state machine program, in constant closed-loop communication with the marking system.

The EIP Controller forms a cooperative relationship with the PLC, by responding to data encoded in EIP protocol packets sent via Ethernet data link. The EIP Controller, in turn, forms a cooperative relationship with the Laser Controller or Dot Peen Controller (i.e. any equivalent general purpose marking controller as defined above), and supervises its individual laser or dot peen marking functions, via Ethernet or serial data link internal to the EIP Protocol Converter System enclosure, respectively. Dot Peen control is carried out over RS-232 serial link and uses the proprietary API commands and protocol supplied by the manufacturer. Laser control is performed over a socket-based Ethernet connection and uses the proprietary API commands and protocol supplied by the manufacturer.

An EIP protocol packet transports the object model front the PLC to the EIP controller. Upon receiving a packet, the System extracts the data structure, parses the setpoints, caches the marking data, and carries out the encoded command by executing a finite state machine program. The EIP controller then carries out the more difficult work of supervising the marking system via its proprietary API. The EIP controller employs the finite state machine program to communicate with the Laser or Dot Peen marking controller, sends sequences of API commands, and uses timers and state variables to closely supervise its operation. Since the EIP controller receives one protocol from the PLC, and outputs another protocol to a marking system, it can be described as a protocol converter.

Besides the two simplified commands commonly used in any marking system to mark a product in a marking job, Load Job File and Prepare and Mark Job, the following EIP protocol commands can also be carried out by the EIP Protocol Converter System: Acquire and Release Host Mode, Transform Job File, Apply Laser Profile, Compute input Field Checksum, Update IO Status, Execute LEC Remote API Command, Save Job File, Re-Mark Job, Prepare Job Only, Mark Job Only. Prepare and Transform Job, Abort Mark, Reset Marking Subsystem, Clear Concatenation String, Concatenate String, Mark and Verify, and Verify Only. Setpoints required for each command are contained in the object model table (data structure). For example, X/Y position, rotation, and scale setpoints specify how to transform the mark to customer requirements.

FIG. 1 depicts an embodiment of the object model employed by the EIP Protocol Converter System to control a laser controller, as expressed in C/C++ syntax. The object model consists of two principal input/output data structures; "CIP_O2T OUTPUT" and "CIP_T2O_INPUT", with each structure containing a mix of smaller data structures, and integer elements. The input/output data structures serve to transport information between the PLC and EIP Protocol Converter System. The "CIP_O2T_OUTPUT" structure transports information output by the PLC, to the EIP Protocol Converter System. The "CIP_T2O_INPUT" data structure transports status information returned by the EIP Protocol Converter System, back to the PLC.

The "CIP_O2T_OUTPUT" structure carries three types of information: commands, setpoints, and marking data. The data structures and constituent elements are described below, in the order that they appear in FIG. 1. The RAPI_MAX_NUM_SHORT_FIELDS 5 and RAPI_MAX_NUM_LONG_FIELDS 2 constants specify that there are five short marking data buffers, and one long marking data buffer. The CIP_STR32, CIP_STR64, and CIP_STR128 are data structures nested within the principal input/output structures. They define buffers holding 32, 64, and 128 alphanumeric characters, respectively. The "CIP_INDEX" is a data structure nested within the principal input structure. It contains four integer setpoints. The "index" element specifies an object number in a laser job file, or a line in a dot peen job file, that is to receive marking data. The "unique" element specifies if the marking data field strings should be cheeked for uniqueness using the duplication prevention system. The "verify" dement specifies if the marking data should be verified by the vision system. The "justify" element specifies the type of text justification to be applied to the marking data. A "CIP_INDEX" data structure exists for each of the marking data buffers, and manifests in the "short_field_index" and "long_field_index" fields. The "x.offset_mm" and "y_offset_mm" setpoints specify the distance to offset (or translate) the mark position in the X and Y axes, on the product surface. The "rotation_deg", "x_rot_center_mm", and "y_rot_center_mm" setpoints specify the angle in degrees to rotate the mark, and the (X, Y) coordinates around which to perform the rotation. Rotation applies to laser marking only. The "x_scale" and "y_scale" setpoints specify the (enlargement/reduction) scaling to apply to the mark, in the X and Y axes. Scaling elements apply to laser marking only.

The "cmd_seq_num" command is an integer that specifies the specific task that the PLC wants the EIP Protocol Converter System to execute. The "LEC_computed_job_field_num" setpoint specifies a laser job file object number. When this setpoint is non-zero, the EIP Protocol Converter System retrieves the computed value of this object from the Laser Controller and returns it to the PLC in the "results_field" of the "CIP_T2O_INPUT" data structure. The "job_tmo_sec" setpoint is an integer timeout, that specifies the maximum time that the EIP Protocol Converter System will wait for the Marking Controller to complete a marking job. The "tcp_tmo_sec" element is an integer timeout, that specifies the maximum time that the EIP Protocol Converter System will wait for a TCP packet response from the Laser Controller. The "barcode_pass_grade" setpoint is an integer threshold, that the Vision System's mark quality analysis grade must meet, in order for the mark data to be considered acceptable. The "max_re-marks" setpoint indicates how many re-marks are allowed to be performed, when the Vision System deems a mark unacceptable. The "short_field_index" and "long_field_index" setpoints are nested data structures containing attributes that are applied to the marking data contained in the "short_field_string" and "long_field_string" elements. These "CIP_INDEX" data structures are described above. The "job_file_name" setpoint specifies the filename of a laser job file, which contains additional marking parameters. The EIP Protocol Converter System directs the Laser Controller to load the specified job file into its internal memory prior to marking. The "camera_job_file_name" setpoint specifies the filename of a job file containing Vision System configuration parameters. The EIP Protocol Converter System directs the Vision System to load the specified job file into its internal memory.

The "short_field_string" and "long_field_string" marking data buffers transport customer alphanumeric data to mark on the product. There are five short 32 character buffers, and one long 128 character buffer.

The "CIP_T2O_INPUT" structure returns status information to the PLC. The data structures and constituent elements are described below. The "marker_state" integer conveys the operational state of the EIP Protocol Converter System. The "last_mark_cycle_time_ms" integer conveys the duration (cycle time) of the last marking cycle. The "status_gpio" element is a bit-mapped integer, whose individual bits convey the state of specific Laser Controller conditions and I/O signals. The "marker_error_code" integer conveys the error code of the last error condition. The "controller_error_code" integer conveys the last error code received from the Laser Controller. The "heart_beat" is a continuously incrementing integer, that can be used by the PLC to confirm that the data link to the EIP Protocol Converter System is active and working. The "input_field_checksum" is an arithmetic sum of the ASCII value of all alphanumeric characters in the marking data buffers, summed with the binary value of other key setpoints. This checksum value is calculated by the EIP Protocol Converter System on data received from the PLC. The PLC can compare this value against its own calculation, to detect if the data may not have arrived intact. Upon loading a job file, the EIP Protocol Converter System puts the name of the job file in the "echo_job_file_name" buffer. The PLC can compare this value against the job file name that it specified, to confirm that the proper file was loaded. The "results_field" is employed to return miscellaneous information to the PLC, depending on the specific command that was executed. The "marker_state_desc" conveys a text description of the current operating state of the EIP Protocol Converter System. The "marker_error_desc" conveys a text description of the current error condition in the EIP Protocol Converter System.

A person with skill in the art would recognize that alternative variations of the object model using various data structures and constituent elements can be used depending on the desired result when using a laser controller. A person with skill in the art would also recognize that variations of the object model can be used with a dot peen controller with the specific data structure and constituent elements used depending on the desired result.

FIG. 2 depicts an embodiment of the EIP Protocol Converter System when used with a Dot Peen Marking System. The EIP Protocol Converter System is composed of EIP Controller 202, Dot Peen Controller 204, and Dot Peen Marking Head 206 subsystems. A PLC sends object model information 201 across an Ethernet network to the EIP Controller 202. Upon receiving the object model information, the EIP Controller 202 supervises marking system operation, by sending proprietary API commands 203 across a serial data link to the Dot Peen Controller 204. The Dot Peen Controller 204 produces electrical control signals 205 to control the action of the Dot Peen Marking Head to imprint 207 (inscribe, mark) the desired marking data onto the surface of the product 208.

Figure 3:
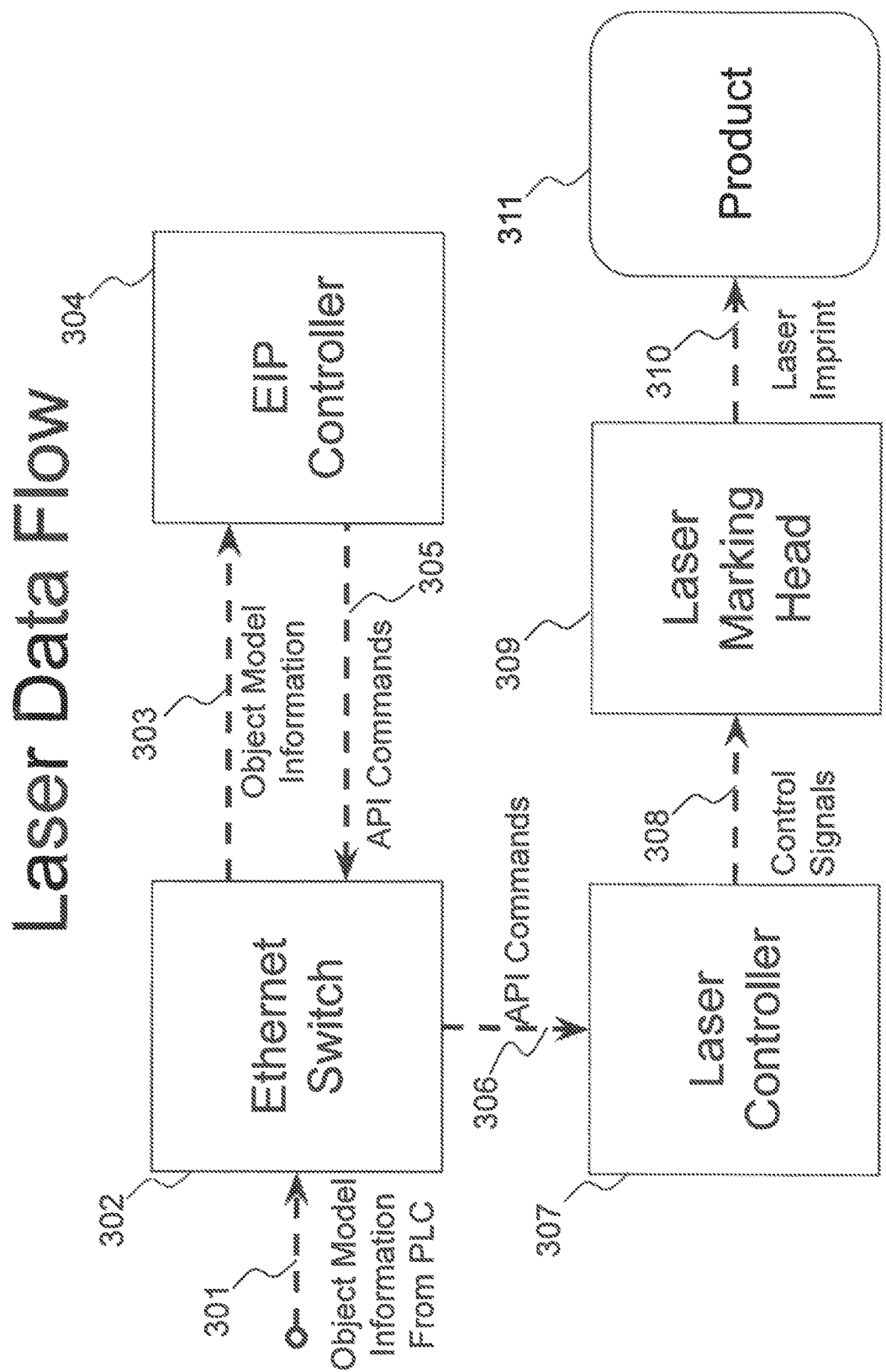
FIG. 3 depicts an embodiment of the EIP Protocol Converter System in use with a laser controller.

FIG. 3 depicts an embodiment of the EIP Protocol Converter System when used with a Laser Marking System. The EIP Protocol Converter System is composed of Ethernet switch 302, EIP Controller 304, Laser Controller 307, and Laser Marking Head 309 subsystems. A PLC sends object model Information 301 across an Ethernet network to a full-duplex 10/100 mbps Ethernet switch 302, which routes the object model information 303 to the EIP Controller 304. Upon receiving the object model information 303, the EIP Controller 304 supervises marking system operation, by sending API commands 305 to the Laser Controller 307 by way of the Ethernet switch 302. The Laser Controller 307 produces electrical control signals 308 to control the action of the Laser Marking Head 309, to laser imprint 310 (laser mark) the desired marking data onto the surface of the product 311.

Figure 4:
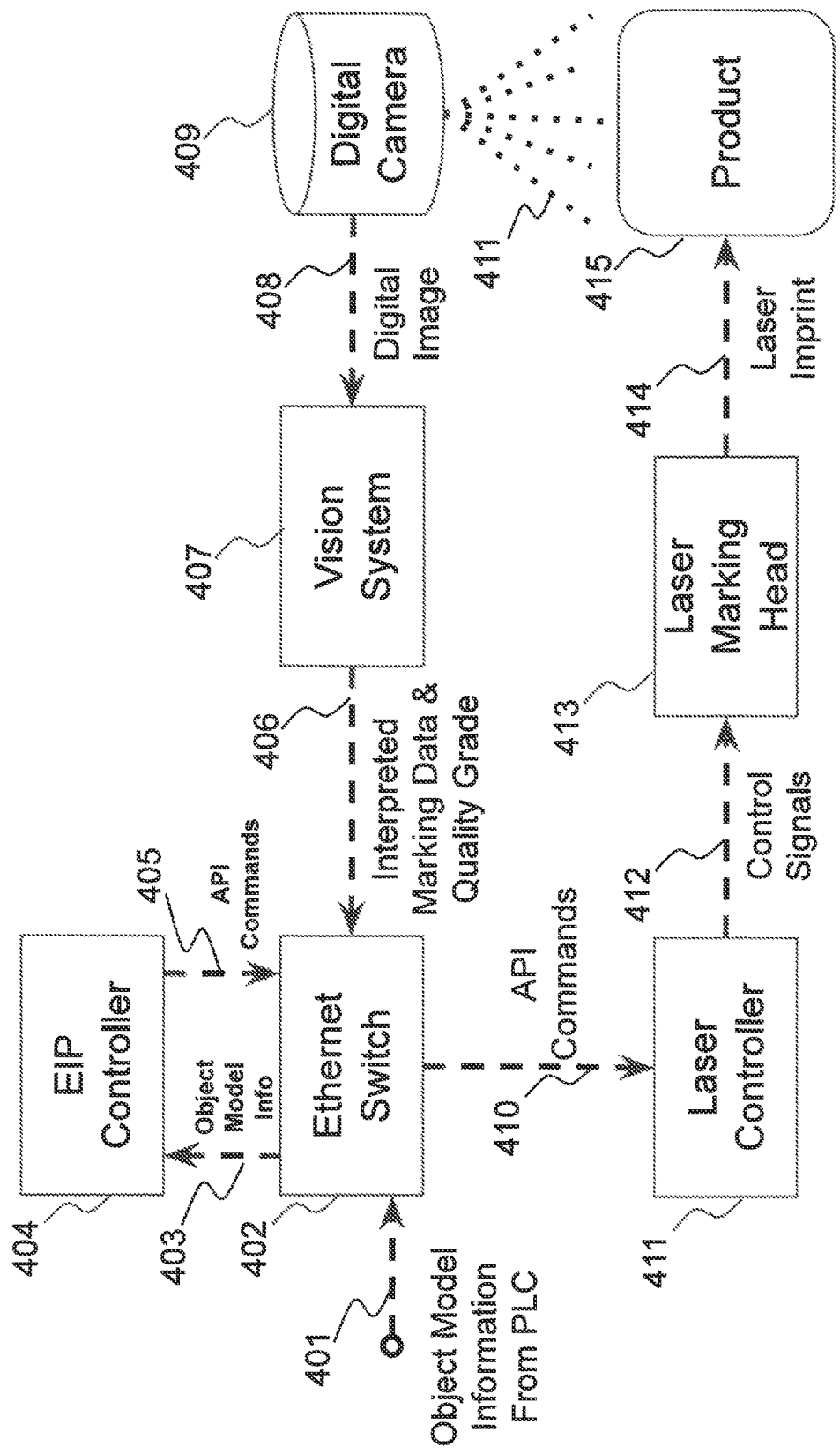
FIG. 4 depicts an embodiment of the EIP Protocol Converter System equipped with a vision system.

FIG. 4 depicts an embodiment of the EIP Protocol Converter System when used with a Laser Marking System equipped with a vision system. The EIP Protocol Converter System is composed of Ethernet switch 402, EIP Controller 404, Vision System 407, Digital Camera 409, Laser Controller 411, and Laser Marking Head 413 subsystems. A PLC sends object model information across an Ethernet network 401 to a full-duplex 10/100 mbps Ethernet switch 402, which routes the object model information 403 to the EIP Controller 404. Upon receiving the object model information 403, the EIP Controller 404 supervises marking system operation, by sending API commands 405 to the Ethernet Switch 402; the Ethernet Switch then sends API Commands 410 to the Laser Controller 411 The Laser Controller 411 produces electrical control signals 412 to control the action of the Laser Marking Head 413, to laser imprint 414 (laser mark) the desired marking data onto the surface of the product 415. After marking, the Digital Camera 409 captures a digital image 408 of the marked product 415, and sends it to the Vision System 407, which analyzes the image. The Vision System 407 executes optical character recognition algorithms to quantify the legibility of human readable text. The Vision System 407 also executes barcode scanning algorithms to verify the readability of linear and two dimensional (data matrix) barcodes. The Vision System 407 analysis calculates a mark quality grade. The Vision System 407 sends the interpreted marking data and quality grade 406 to the EIP Controller 404, by way of the Ethernet switch 402. The EIP Controller 404 executes the vision system verification algorithm, described in detail in FIG. 7 to verify that the product mark is legible, and of acceptable quality. If mark quality falls below a minimum threshold, the EIP Controller 404 repeats the marking cycle to create a new mark.

In a preferred embodiment there is a marking of long text strings by string concatenation, which solves the problem of strings being limited to the maximum 512 byte EIP packet size. The EIP Protocol Converter System collects in its internal memory, text strings sent in consecutive EIP packets, and concatenates them into a single larger text string. This larger text string can then be marked.

Figure 5:
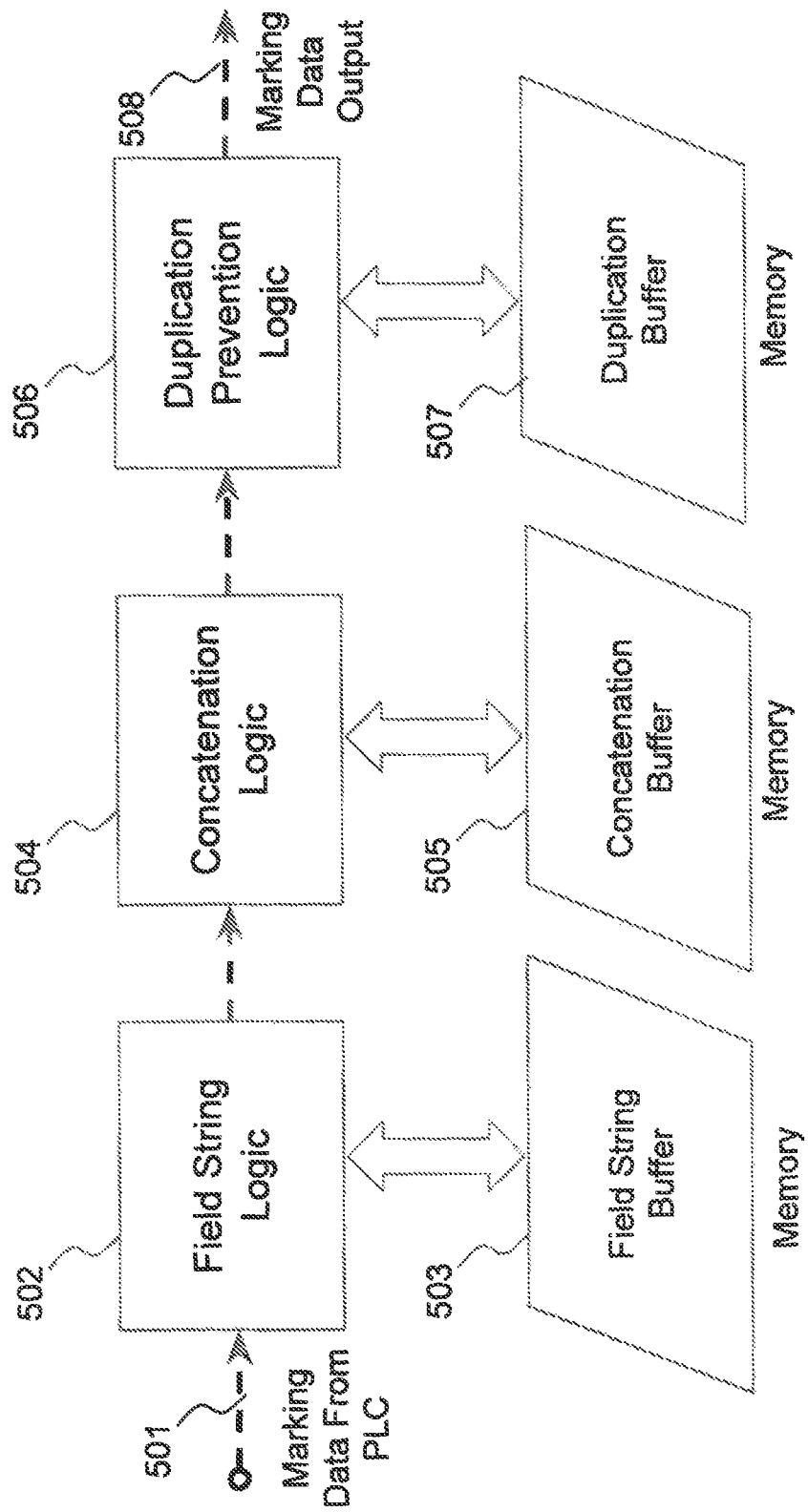
FIG. 5 depicts an embodiment of the EIP Protocol Converter System that performs concatenation and duplication prevention functions.

FIG. 5 depicts an embodiment of the EIP Controller involved in concatenation and duplication prevention functions for use with either a laser controller system or a dot peen controller system. Object model information that contains marking data sent by the PLC arrives via Ethernet network 501 and flows through three software logic modules: Field String Logic 502, Concatenation Logic 504, and Duplication Prevention Logic 506. The Field String Logic 502 module collects Field Strings (discrete blocks of marking data), and caches them in the Field String Buffer 503 memory. The cached Field Strings can then be individually manipulated and indexed. The Concatenation Logic 504 module collects Field Strings sent in consecutive Ethernet packets, and appends them together in a large Concatenation Buffer 505 memory. The Concatenation Logic 504 allows construction of larger text strings of marking data that are bigger than will fit in individual Ethernet packets. In some embodiments, the information in the Concatenation Buffer 505 can then directly be marked onto product. However, preferably as shown here, in addition to the concatenation function there is also a duplication prevention function (described in more detail in FIG. 6 below). The Duplication Prevention Logic 506 module stores the marking data in the Duplication Buffer 507 memory, and then executes the algorithm described in FIG. 6. The algorithm compares consecutive Field Strings, and if it detects duplicate values, prevents the duplicate data from being marked. Once the marking data has successfully passed through the three software logic modules 502 504 506, it flows 508 to a Laser or Dot Peen subsystem and is marked onto product.

The EIP Protocol Converter System may be configured to protect against unwanted serial number duplication either in conjunction with the concatenation function or it can be used alone without the use of the concatenation function. The user can declare specific marker fields to contain "unique serial numbers". The EIP Protocol Converter System receives and stores the content of these fields in its internal memory. When receiving a new EIP command to mark, the EIP Protocol Converter System compares the content of these fields to the previously received content stored in its internal memory. If the content is identical, the EIP Protocol Converter System prevents the marking process from starting and raises a "duplicate serial number" or "uniqueness" fault.

Figure 6:
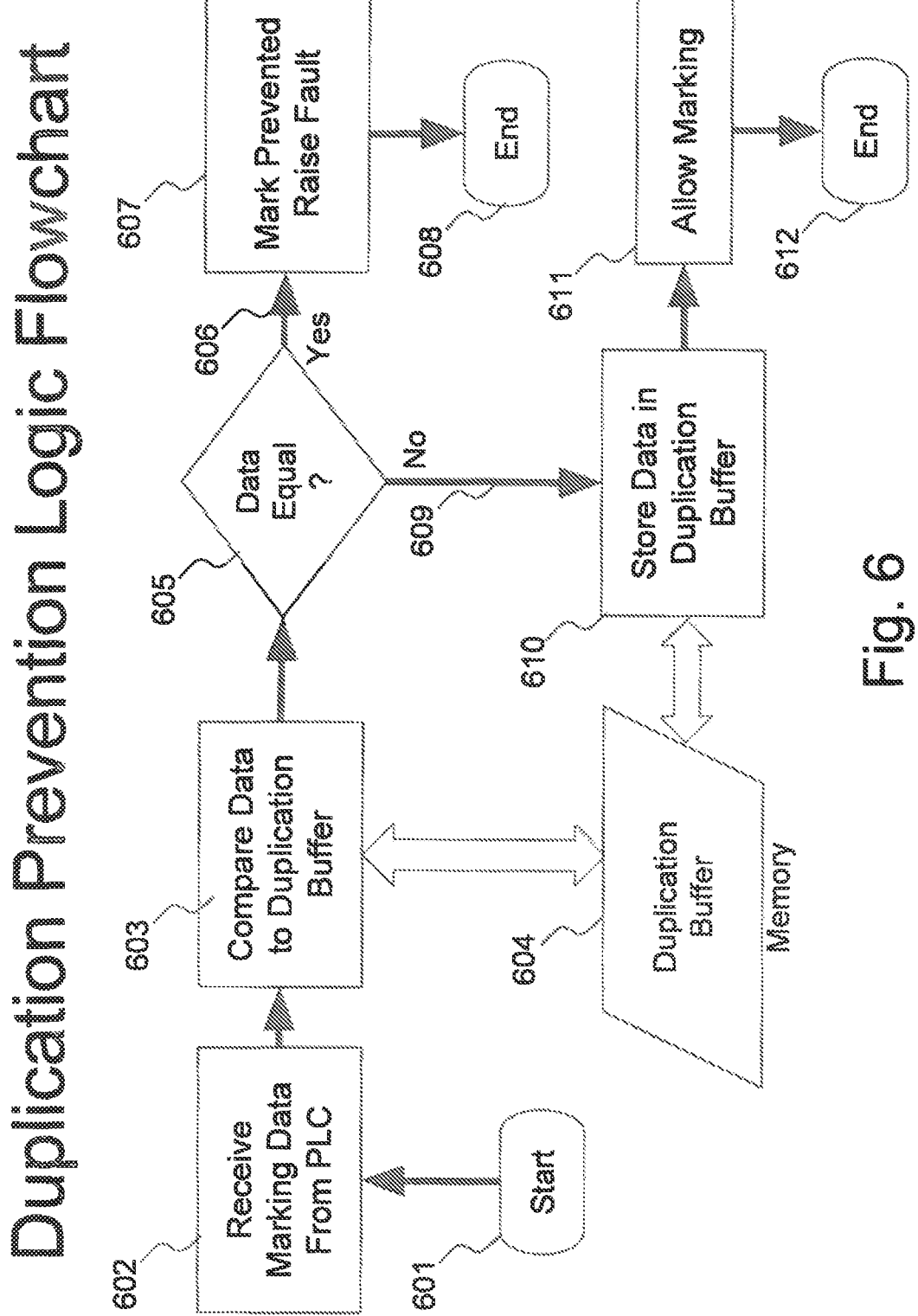
FIG. 6 depicts the flowchart of EIP Protocol Converter System software logic for duplication prevention.

FIG. 6 depicts a flowchart of the duplication prevention algorithm in EIP Controller software that can be used with either a laser controller or dot peen controller system This ensures that the marking data field strings are unique. The algorithm starts execution 601 by receiving the marking data sent by the PLC 602. The marking data is divided into an indexed array of discrete blocks called Field Strings. Any one Field String array element can be enabled for duplication prevention, by selecting its index. Each newly received Field String with the selected index is compared 603 to the previously received Field String stored in the duplication buffer 604. If consecutively received Field Strings are equal 605 & 606, a duplication fault is raised and marking is prevented 607, and the algorithm terminates 608. If consecutive field strings are not equal 605 & 609, the received Field String is stored 610 in the duplication buffer 604 for subsequent comparison, marking is allowed 611 and the algorithm terminates 612.

The EIP Protocol Converter System maybe further configured to provide automatic verification of the quality of the mark created. Marks may contain machine readable information, in the form of 1D barcodes and 2D data matrix barcodes. The EIP Protocol Converter System integrates with a Cognex, or to a similar industrial vision system, which visually inspects the mark just created, reads the encoded data, and grades the quality of the mark. If the vision system deems the mark of poor quality, the EIP Protocol Converter System optionally invokes an automatic re-mark capability.

The EIP Protocol Converter System may be further configured to provide an automatic re-mark capability. The visual quality and legibility of a mark is graded by an integrated industrial vision system. The vision system employs a digital camera, OCR (optical character recognition), and barcode detection algorithms to quantify mark quality and machine readability.

When the attached vision system deems a created mark to be of unacceptable visual quality, the Automatic Re-mark feature follows a special re-mark procedure. This procedure employs dedicated re-mark information to obliterate (erase) the previous mark, and then performs a re-mark with different parameters, to enhance the mark's visual quality. This process may be repeated more than once. Each repetition is graded for quality, which triggers a subsequent re-mark, or raises a "mark quality failure" fault after a specified number of re-marks has been attempted.

Figure 7:
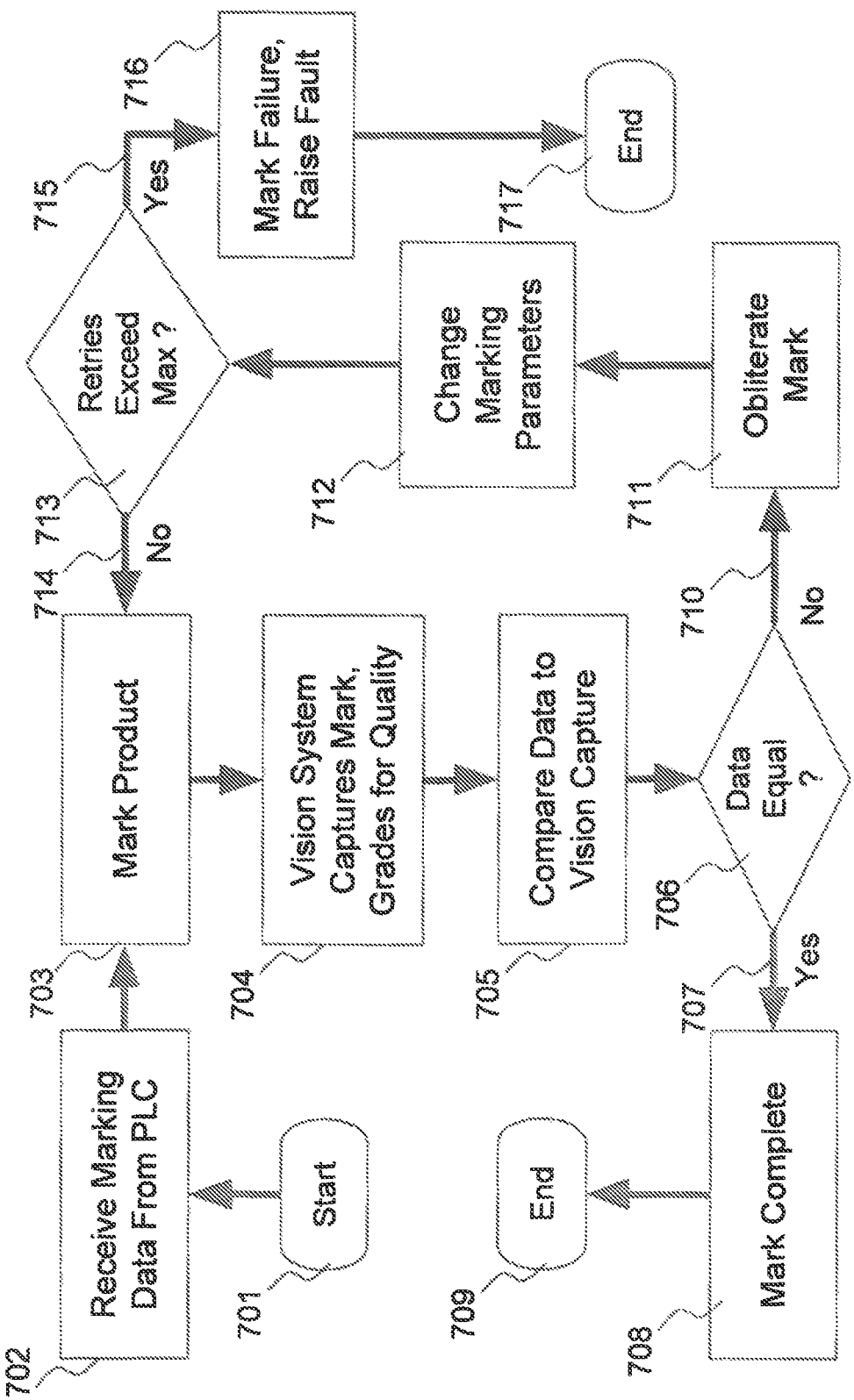
FIG. 7 depicts the flowchart of EIP Protocol Converter System software logic for vision system marking verification.

FIG. 7 depicts a flowchart of the vision system marking verification algorithm in EIP Controller software that can be used with either a laser controller or a dot peen controller system. The algorithm starts execution 701 by receiving marking data sent by the PLC 702 and marks the data on the product 703. The Vision system 704 employs a digital camera to capture an image of the marked product 703. The vision system 704 executed optical character recognition (OCR) algorithms to verify the machine readability of linear and two dimensional (data matrix) barcodes and calculates a mark quality grade. The verification algorithm compares 705 the original data to the marked data captured by the vision system 704. If the data is not equal 706 & 707, the marking cycle is complete 708, and the algorithm ends 709. If the data is not equal or has a low quality grade 706 & 710, the algorithm obliterates the mark 711, and prepares to repeat the marking cycle. On each cycle, the algorithm adjusts marking parameters 712 (such as laser power) to enhance the quality and legibility of each subsequent mark. Provided the maximum number of retries is not exceeded 713 & 714, the product is marked again 703. If the maximum number of retries is exceeded 713 & 715, a mark failure fault is raised 716, and the algorithm terminates 717.

The EIP Protocol Converter System can be utilized on an EIP controller which can be an off-the-shelf single-board computer. The Net Burner SB70 LC single-board computer is a non-limiting example. The Net Burner SB70 LC single-board computer employs a 32-bit Cold Fire microcontroller, 512 KB of flash memory, 8 MB of SDRAM memory, RS-232 serial and USB ports, and an Ethernet port. The key specifications required for the EIP Controller function, are the RS-232 serial and Ethernet ports. This disclosure contemplates any controller known in the art with comparable specifications, including but not limited to the Net Burner SB70LC, as being capable of fulfilling the EIP Controller function. Likewise, the EIP Protocol Converter System is not restricted to controlling any specific models of Laser or Dot Peen marking controllers. Any marking system that exposes a programmable API interface, can similarly be controlled.

The software for the EIP Protocol Converter System is developed in C/C++, cross-compiled using the GNU toolchain, and programmed into flash memory. The software runs in three tasks under the uCOS RTOS (Real Time Operating System) and employs TCP/IP and EtherNet/IP (EIP) protocol stacks. EIP stacks are commercially available from numerous sources and certified by the ODVA, the Open DeviceNet Vendors Association (that promulgates the EtherNet/IP standard). ODVA certification assures interoperability with any third-party EIP equipment.

The foregoing description merely illustrates the EIP Protocol Converter System is not intended to be limiting. It will be apparent to those skilled In the art that various modifications can be made without departing front the inventive concept. Accordingly, it is not intended that the EIP Protocol Converter System be limited except by the appended claims.

The invention claimed is:

1. An EtherNet/IP Industrial Protocol (EIP) protocol converter system that enables programmable logic controller (PLC) control of marking systems comprising:
   a marking controller comprising a marking system utilized by a specific manufacturer;
   a PLC generating an object model the object model being a compound data structure representing a virtual marking system corresponding to the marking system of the marking controller; the object model comprised of information expressed as a table incorporating tags, the tags representing values corresponding to functions that are recognized by the marking controller; said functions comprising commands, marking data, and setpoints;
   an EIP controller receiving the object model as an EIP packet sent from the PLC via an Ethernet data link;
   the EIP controller exposing the object model in the EIP protocol, extracting the information, executing one or more finite state machine programs whereby the information is translated into a sequence of proprietary API commands that is recognized by the marking controller, communicating the proprietary API commands to the marking controller, which is in constant loop communication with the one or more finite state machines, thereby supervising the functions of the marking controller to complete a marking job.

2. The system of claim 1 wherein a PLC generating an object model is accomplished by a PLC program writing desired values into the table incorporating tags.

3. The system of claim 1 wherein supervising the functions of the marking controller to complete a marking job is performed using only two EIP commands: Load Job File, and Prepare, and Mark Job.

4. The system of claim 1 wherein the marking controller is a dot peen marking controller.

5. The system of claim 1 wherein the marking controller is a laser marking controller.

6. The system of claim 5 further comprised of an Ethernet switch which routes the object model from the PLC to the EIP controller and which communicates the proprietary API commands from the EIP controller to the laser marking controller.

7. The system of claim 1 further comprised of a vision system that calculates a mark quality grade.

8. The system of claim 7 wherein the EIP controller receives data from the vision system and compares the data from the vision system to the marking data received from object model, if the data from the vision system and the marking data received from object model are equal then the marking job is complete, if the data from the vision system is a lower quality grade than the marking data received from object mode l then the marking job is repeated.

9. The system of claim 1 wherein the EIP controller executes a concatenation function, the concatenation function comprising receiving the marking data in discrete blocks as field strings, caching and indexing the field strings, collecting the field strings and appending the field strings together in a large concatenation buffer memory forming a larger single text string.

10. The system of claim 1, wherein the EIP controller executes a duplication prevention function, the duplication prevention function comprising comparing newly received marking data to previously received marking data, if the newly received marking data and the previously received marking data are equal a duplication fault is raised and the marking job is prevented, if the newly received marking data and the previously received marking data are not equal, the newly received marking data is stored for subsequent comparison and the marking job is allowed to proceed.

* * * * *